United States Patent
Nakatani et al.

(10) Patent No.: US 8,818,301 B2
(45) Date of Patent: Aug. 26, 2014

(54) TRANSMISSION DEVICE

(75) Inventors: Koji Nakatani, Hiratsuka (JP); Shu Yamada, Hiratsuka (JP); Sigeki Sakakibara, Hiratsuka (JP); Michito Kaneko, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 13/877,382

(22) PCT Filed: Jul. 14, 2011

(86) PCT No.: PCT/JP2011/066131
§ 371 (c)(1),
(2), (4) Date: Apr. 2, 2013

(87) PCT Pub. No.: WO2012/046486
PCT Pub. Date: Apr. 12, 2012

(65) Prior Publication Data
US 2013/0189938 A1 Jul. 25, 2013

(30) Foreign Application Priority Data
Oct. 6, 2010 (JP) ................................. 2010-226415

(51) Int. Cl.
*H04B 1/04* (2006.01)

(52) U.S. Cl.
USPC .......... 455/103; 455/128; 455/129; 455/90.3; 455/575.7; 455/349

(58) Field of Classification Search
CPC .................... H04M 1/02–1/236; H01Q 1/243; H04B 1/3833; H04B 1/034; H04B 1/04; H04B 1/08; H04B 1/086; H04B 7/0617; H05K 7/02; H01R 24/50

USPC .......... 455/575.1–575.8, 90.3, 128, 347–351, 455/103, 117, 129, 553.1
See application file for complete search history.

(56) References Cited

U.S. PATENT DOCUMENTS 4,625,212 A * 11/1986 Oda et al. ...................... 343/702
4,969,206 A * 11/1990 Desrochers ................ 455/575.5
(Continued)

FOREIGN PATENT DOCUMENTS

| EP | 1631131 A2 | 3/2006 |
|---|---|---|
| JP | 2010-175298 | 8/2010 |

OTHER PUBLICATIONS

International Search Report of corresponding International Application No. PCT/JP20111066131, dated on Aug. 16, 2011.
(Continued)

*Primary Examiner* — Edward Urban
*Assistant Examiner* — Rui Hu
(74) *Attorney, Agent, or Firm* — Global IP Counselors, LLP

(57) ABSTRACT

The transmission device is constituted by transmitting units which are accommodated within a case in a state so that, in an xyz orthogonal coordinate system, in the z axis direction only two transmitting units are disposed adjacently and so that planar conducting plates are opposed to each other; in the x axis direction, two adjacent transmitting units are disposed so that one end portion of one unit and the other end portion of the other unit are adjacent; and in the y axis direction, two adjacent transmitting units are disposed so that one end portion of one unit and the other end portion of the other unit are adjacent.

16 Claims, 10 Drawing Sheets

(56) References Cited

U.S. PATENT DOCUMENTS

| | | | |
|---|---|---|---|
| 5,564,083 A * | 10/1996 | Lee et al. | 455/575.7 |
| 5,673,131 A * | 9/1997 | Jacobsen | 398/141 |
| 6,072,992 A * | 6/2000 | Mishima et al. | 455/76 |
| 6,121,931 A * | 9/2000 | Levi | 343/700 MS |
| 6,388,879 B1 * | 5/2002 | Otaguro et al. | 361/695 |
| 6,421,016 B1 * | 7/2002 | Phillips et al. | 343/702 |
| 6,766,149 B1 * | 7/2004 | Hikita et al. | 455/83 |
| 6,904,296 B2 * | 6/2005 | Geeraert et al. | 455/550.1 |
| 6,967,619 B2 * | 11/2005 | Khoo et al. | 343/700 MS |
| 7,725,095 B2 * | 5/2010 | Tey et al. | 455/347 |
| 7,755,552 B2 * | 7/2010 | Schantz et al. | 343/718 |
| 8,283,990 B2 * | 10/2012 | Tenno et al. | 333/24 R |
| 2002/0037757 A1 * | 3/2002 | Kaiponen et al. | 455/575 |
| 2004/0127249 A1 * | 7/2004 | Hankui et al. | 455/550.1 |
| 2004/0132505 A1 * | 7/2004 | Leclerc et al. | 455/575.1 |
| 2005/0064815 A1 * | 3/2005 | Kanazawa | 455/41.1 |
| 2005/0090274 A1 * | 4/2005 | Miyashita | 455/502 |
| 2006/0042829 A1 * | 3/2006 | Matsuo et al. | 174/255 |
| 2006/0045417 A1 * | 3/2006 | Morita | 385/31 |
| 2007/0213023 A1 * | 9/2007 | Ikeda | 455/274 |
| 2009/0197653 A1 * | 8/2009 | Mizoguch et al. | 455/575.7 |
| 2009/0197654 A1 * | 8/2009 | Teshima et al. | 455/575.7 |

OTHER PUBLICATIONS

European search report of corresponding European Patent Application No. 11830420.3, dated on Mar. 12, 2014.

* cited by examiner

TRANSMISSION DEVICE

CROSS-REFERENCE TO RELATED APPLICATIONS

This U.S. National stage application claims priority under 35 U.S.C. §119(a) to Japanese Patent Application No. 2010-226415, filed in Japan on Oct. 6, 2010, the entire contents of Japanese Patent Application No. 2010-226415 are hereby incorporated herein by reference.

BACKGROUND

1. Field of Invention

The present invention relates to a transmission device constituted by a plurality of transmitting units disposed adjacently to one another.

2. Background Information

Conventionally, transmission devices that employ transmitting units which are provided with sensors and which are adapted to transmit detected values for physical states that have been detected by the sensors, such as temperature, humidity, pressure, or the like, to a remote location by radio waves are known.

For example, in pneumatic fenders of the sort employed when bringing a boat alongside a pier or alongside another boat, it is known to detect the internal air pressure by the sensor of a transmitting unit, and to employ the transmitting unit to transmit detected values to a remote location by radio waves, and receive the values so that the internal air pressure can be monitored without having to touch the pneumatic fender.

As one example of such a device, in the device disclosed in Japanese Patent Application Laid-open No. 2010-175298, for example, in order to transmit information at shorter time intervals than a transmission pause time specified by law, a plurality of transmitters is provided, the transmission timing in each of the transmitters being set so as to differ in a sequential manner with predetermined intervals therebetween, whereby by employing the plurality of transmitters, transmission can take place at shorter time intervals than the transmission pause time.

SUMMARY

However, in numerous instances, when a plurality of transmitters is accommodated within the minimum space necessary, the transmitters interfere with one another, and the transmit gain declines to the point that transmission of radio waves cannot take place in a satisfactory state.

It is an object of the present invention to offer a transmission device whereby, even when a plurality of transmitting units is accommodated within the minimum space necessary in the aforedescribed manner, the decline in transmit gain is reduced, and emission of radio waves can take place in a satisfactory manner.

In order to achieve the aforedescribed object, the present invention provides a transmission device in which a plurality of transmitting units are adjacently disposed, including: the transmitting units having; first and second rectangular printed circuit boards disposed so that surfaces thereof are mutually parallel and surfaces on one side of each of the first and second printed circuit boards are in mutual opposition; a plurality of columnar connecting conductors furnished between the first printed circuit board and the second printed circuit board, the columnar connecting conductors being adapted for affixing one of the printed circuit boards to the other of the printed circuit boards with a predetermined interval therebetween, and conductively connecting a printed wiring of one of the printed circuit boards and a printed wiring of the other of the printed circuit boards; an electronic component forming a transmission circuit being mounted at one end portions of the first and second printed circuit boards in a lengthwise direction; a coil-shaped antenna that has a center axis extending in a width direction of the first and second printed circuit boards at the other end portions of the first and second printed circuit boards in the lengthwise direction; and a planar conductor plate affixed to the first printed circuit board, parallel to the other surface of the first printed circuit board at the other end portion thereof, wherein in an xyz orthogonal coordinate system, only two of the transmitting units being are disposed so as to be adjacent in a z axis direction, and so that the planar conductor plates are opposed to each other; two of the transmitting units that are adjacent in an x axis direction being disposed so that the one end portion of one of the transmitting units and the other end portion of the other of the transmitting units are adjacent, and two of the transmitting units that are adjacent in a y axis direction being disposed so that one end portion of one of the transmitting units and the other end portion of the other of the transmitting units are adjacent.

Moreover, in order to achieve the aforedescribed object, the present invention provides a transmission device in which a plurality of transmitting units are adjacently disposed, including: the transmitting units having; first and second rectangular printed circuit boards disposed so that surfaces thereof are mutually parallel and surfaces on one side of each of the first and second printed circuit boards are in mutual opposition; a plurality of columnar connecting conductors furnished between the first printed circuit board and the second printed circuit board, the columnar connecting conductors being adapted for affixing one of the printed circuit boards to the other of the printed circuit boards with a predetermined interval therebetween, and conductively connecting a printed wiring of one of the printed circuit boards and a printed wiring of the other of the printed circuit boards; an electronic component forming a transmission circuit being mounted at one end portions of the first and second printed circuit boards in a lengthwise direction; a coil-shaped antenna that has a center axis extending in a width direction of the first and second printed circuit boards at the other end portions of the first and second printed circuit boards in the lengthwise direction; and a planar conductor plate affixed to the first printed circuit board, parallel to the other surface of the first printed circuit board at the other end portion thereof, wherein in an xyz orthogonal coordinate system, only two of the transmitting units being adjacent in a z axis direction so that the first printed circuit boards are opposed to each other, and are disposed so that one end portion of one of the transmitting units and the other end portion of the other of the transmitting units are adjacent, two of the transmitting units that are adjacent in an x axis direction being disposed so that the one end portion of one of the transmitting units and the other end portion of the other of the transmitting units are adjacent, and two of the transmitting units that are adjacent in a y axis direction being disposed so that the one end portion of one of the transmitting units and the other end portion of the other of the transmitting units are adjacent.

In the transmission device of the present invention, interference among the coil-shaped antennas is minimized by having the transmitting units formed in the aforedescribed manner, and a plurality of the transmitting units lined up adjacently so that the coil-shaped antennas are not adjacent, or when they are adjacent, the planar conductor plates are disposed therebetween. Therefore, even when the plurality of transmitting units is accommodated within the minimum space necessary, the decline in transmit gain is reduced, and emission of radio waves can take place in a satisfactory manner.

DETAILED DESCRIPTION OF EMBODIMENTS

An embodiment of the present invention is described below with reference to the drawings.

Figure 1:
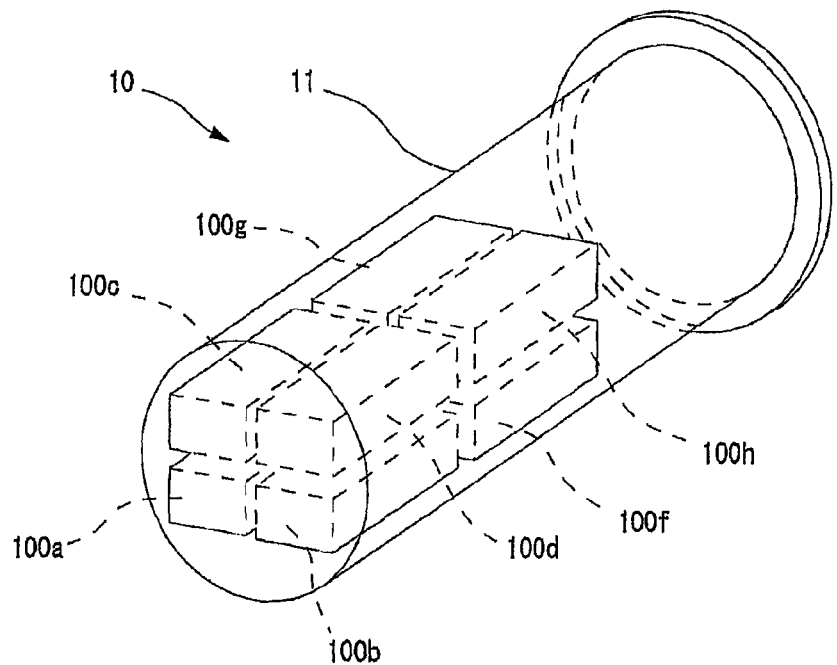
FIG. 1 is an exterior view showing a transmission device in an embodiment of the present invention.
Figure 2:
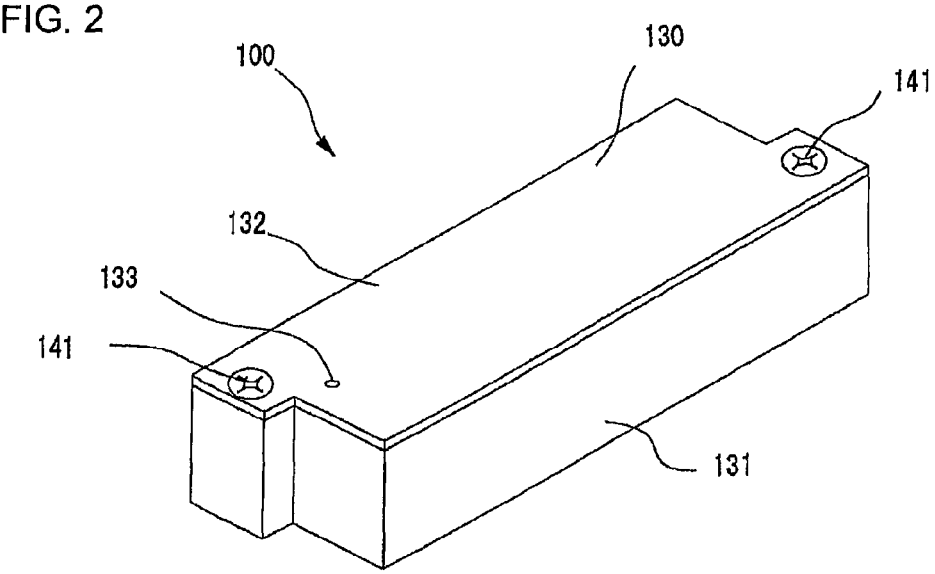
FIG. 2 is an exterior perspective view showing the transmitting unit in the embodiment of the present invention.
Figure 3:
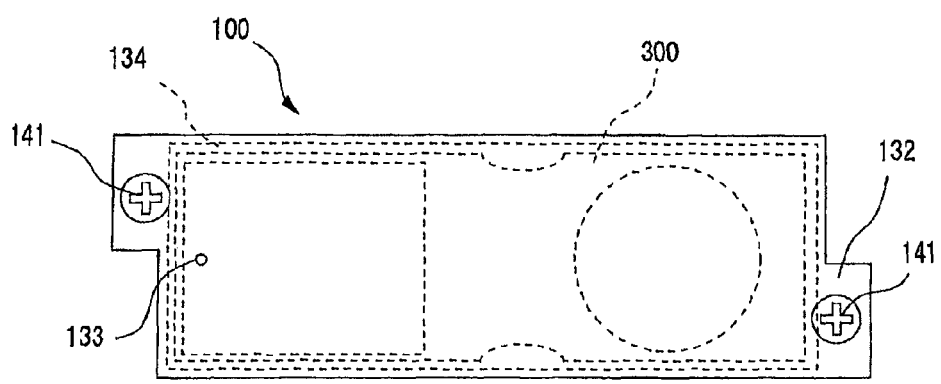
FIG. 3 is a plan view showing the transmitting unit in the embodiment of the present invention.
Figure 4:
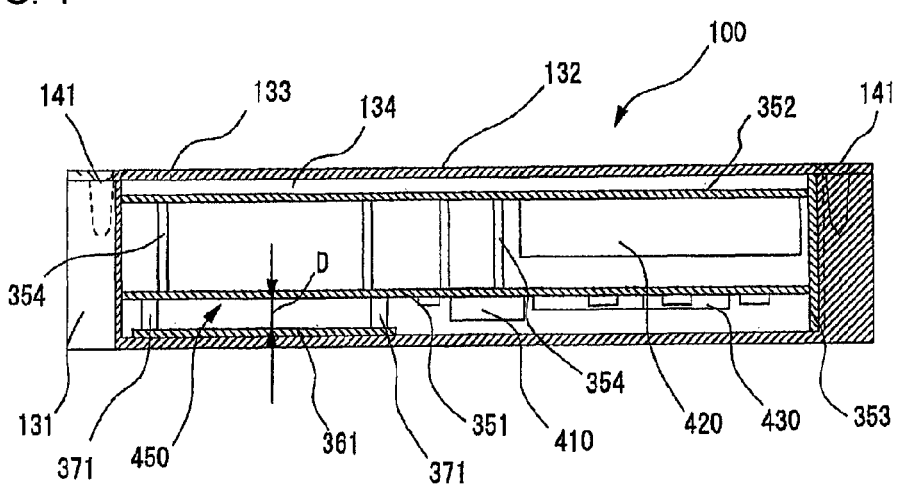
FIG. 4 is a lateral cross-sectional view showing the transmitting unit in the embodiment of the present invention.
Figure 5:
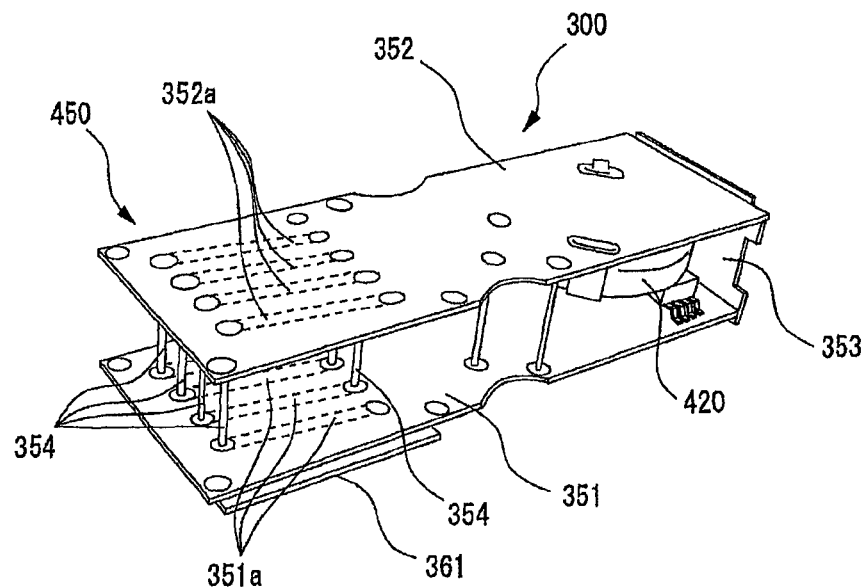
FIG. 5 is an exterior perspective view showing a unit body in the embodiment of the present invention.
Figure 6:
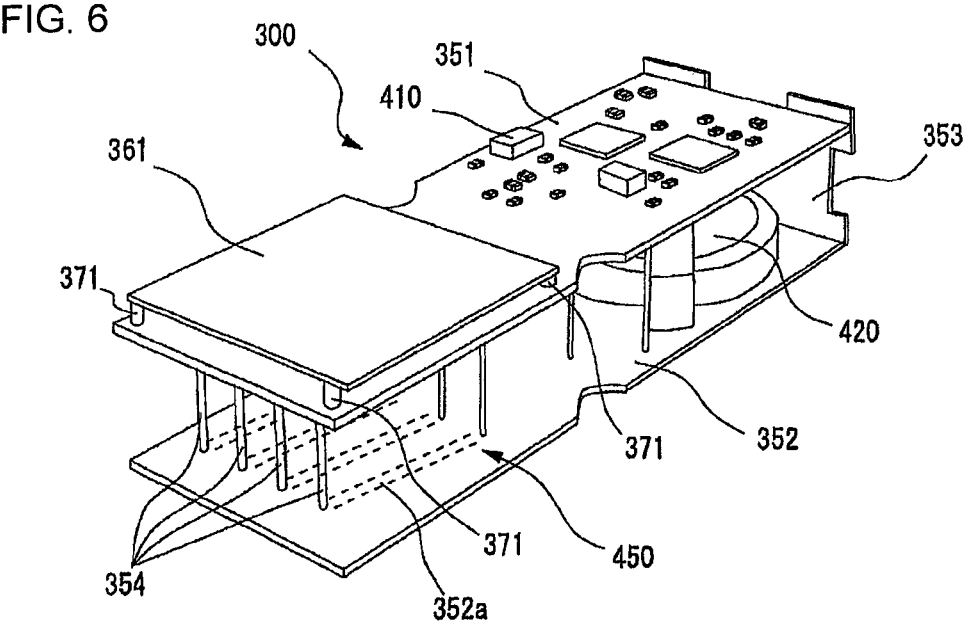
FIG. 6 is an exterior perspective view showing the unit body in the embodiment of the present invention.
Figure 7:
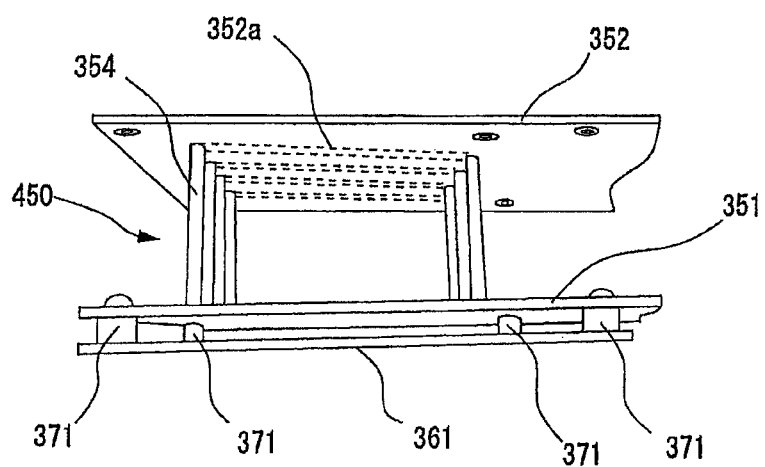
FIG. 7 is an exterior perspective view showing a main section of the unit body in the embodiment of the present invention.
Figure 8:
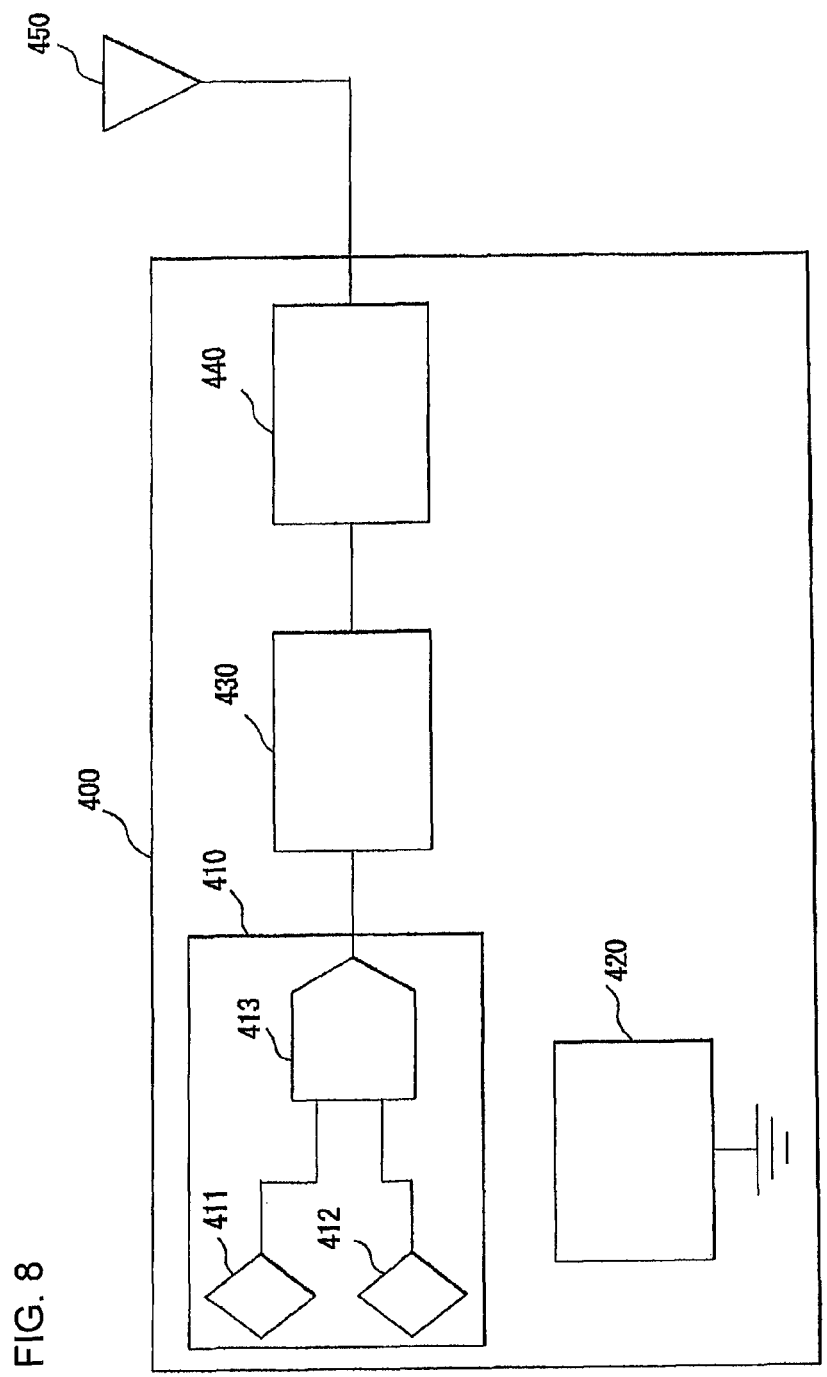
FIG. 8 is a block diagram showing an electrical circuitry of the transmitting unit in the embodiment of the present invention.

FIG. 1 is an exterior view showing a transmission device in an embodiment of the present invention; FIG. 2 is an exterior perspective view showing the transmitting unit in the embodiment of the present invention; FIG. 3 is a plan view showing the transmitting unit in the embodiment of the present invention; FIG. 4 is a lateral cross-sectional view showing the transmitting unit in the embodiment of the present invention; FIGS. 5 and 6 are exterior perspective views showing a unit body in the embodiment of the present invention; FIG. 7 is an exterior perspective view showing a main section of the unit body in the embodiment of the present invention; and FIG. 8 is a block diagram showing an electrical circuitry of the transmitting unit in the embodiment of the present invention.

In the drawings, 10 is the transmission device, which is constituted by eight transmitting units 100 (100a to 100h) accommodated inside a cylindrical case 11 that is formed of an insulator that is transmissive of radio waves.

The transmitting units 100 (100a to 100h) are respectively all of the same shape, and are constituted by a unit body 300 accommodated within a substantially rectangular parallelepiped case 130 that is formed of an insulator that is transmissive of radio waves.

As shown in FIGS. 2 to 4, the case 130 of the transmitting unit 100 is substantially rectangular parallelepipedal in shape having at the lengthwise end portions thereof protruding sections for screw fastening purposes, and is constituted by a case body 131 and a cover 132. As shown in FIG. 4, an accommodating space 134 for accommodating the unit body 300 is formed in the interior of the case body 131, and the opening of the accommodating space 134 is sealed off by affixing the cover 132 to the case body 131 with screws 141. A vent hole 133 is formed in the cover 132, so that even in a state in which the cover 132 has been affixed to the case body 131, air can flow from the outside into the accommodating space 134 through this vent hole 133.

As shown in FIGS. 5 to 7, in the unit body 300, two printed circuit boards 351, 352 of substantially rectangular shape are disposed parallel to one another with a predetermined interval therebetween, the boards being affixed to one another by columnar connecting conductors 354 that constitute an antenna 450, and by a third printed circuit board 353 for linking purposes. The coil-shaped antenna 450, which has a center axis that extends in the width direction of the first and second printed circuit boards 351, 351, is formed in the other end portion in the lengthwise direction of the unit body 300, while electronic components, such as a sensor portion 410, a battery cell 420, and the like, that constitute an electronic circuit are mounted at one end. The linking printed circuit board 353 is soldered to the respective two printed circuit boards 351, 352.

The first printed circuit board 351 and the second printed circuit board 352 are linked by the plurality of columnar connecting conductors 354 furnished therebetween, the connecting conductors affixing one of the printed circuit boards to the other printed circuit board with a predetermined interval therebetween and conductively connecting the printed wiring of one printed circuit board and the printed wiring of the other printed circuit board.

A detection/transmission circuit 400, shown in FIG. 8, is formed in the unit body 300. Specifically, the detection/transmission circuit 400 is constituted by the sensor portion 410, the battery cell 420, a main control portion 430, a transmission portion 440, and the antenna 450.

The sensor portion 410 is mounted on the surface of the main body 300, and is constituted by an air pressure detector element 411, a temperature detector element 412, and an analog/digital conversion circuit 413. Air pressure and temperature within, for example, an air chamber of a pneumatic fender, are detected by the air pressure detector element 411 and the temperature detector element 412, and the detected results are converted to digital values by the analog/digital conversion circuit 413, and output to the main control portion 430.

The battery cell 420 is linked to the unit body 300 by a connecting conductor, and is designed to supply power to the detection/transmission circuit 400 formed in the unit body 300.

The main control portion 430 is constituted by known elements such as a CPU, memory, and the like; and upon receiving the detected results from the sensor portion 410 in the form of digital values, is designed to generate digital information including the digital values to output to the transmission portion 440. In addition to digital values of the aforedescribed detected results, this digital information includes identifying information specific to the unit body 300, such as a serial number or the like.

The transmission portion 440 transmits the digital information input from the main control portion 430 by radio waves of a predetermined frequency, for example, 315 MHz.

The antenna 450 is a coil-shaped antenna, the resonance frequency of which has been set to the transmission frequency of the transmission portion 440, and is formed by a printed wiring 351a furnished to the first printed circuit board 351, a printed wiring 352a furnished to the second printed circuit board 352, and the columnar connecting conductors 354 which conductively connect the printed wiring furnished to the first printed circuit board 351 and the printed wiring furnished to the second printed circuit board 352 and which affix the printed circuit boards 351, 352 to one another.

Figure 9:
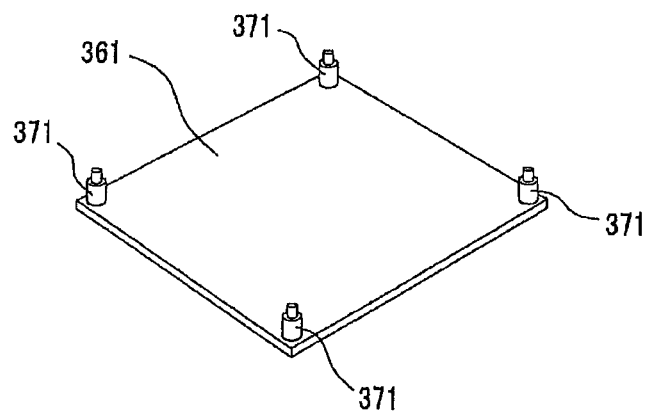
FIG. 9 is an exterior perspective view showing a planar conducting plate and a retaining member in the embodiment of the present invention.
Figure 10:
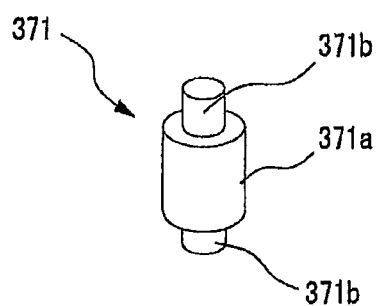
FIG. 10 is an exterior perspective view showing the retaining member in the embodiment of the present invention.

Furthermore, a planar conducting plate 361 of rectangular shape is affixed by four retainers 371 to the outer surface of the other end portion of the first printed circuit board 351. The planar conducting plate 361 is furnished at the position of the antenna 450, so as to be parallel to the printed circuit board 351 that is positioned to the bottom surface side of the case body 131 when the unit body 300 is accommodated in the case 130. The planar conducting plate 361 is affixed by the retainers 371 in such a way that a predetermined interval is maintained with respect to the first printed circuit board 351. This planar conducting plate 361 is conductively connected to a predetermined conductor pattern (the conductor pattern connected to the negative pole of the battery cell 420) of the first printed circuit board 351, and is set to a reference potential. As shown in FIG. 9, the retainers 371 are affixed to the four corners of the planar conducting plate 361. As shown in FIG. 10, the shape of the retainers 371 is one in which a body 371a of round columnar shape is provided at either end with protruding portions 371b of round columnar shape, which are smaller in diameter than the body 371a.

Figure 11:
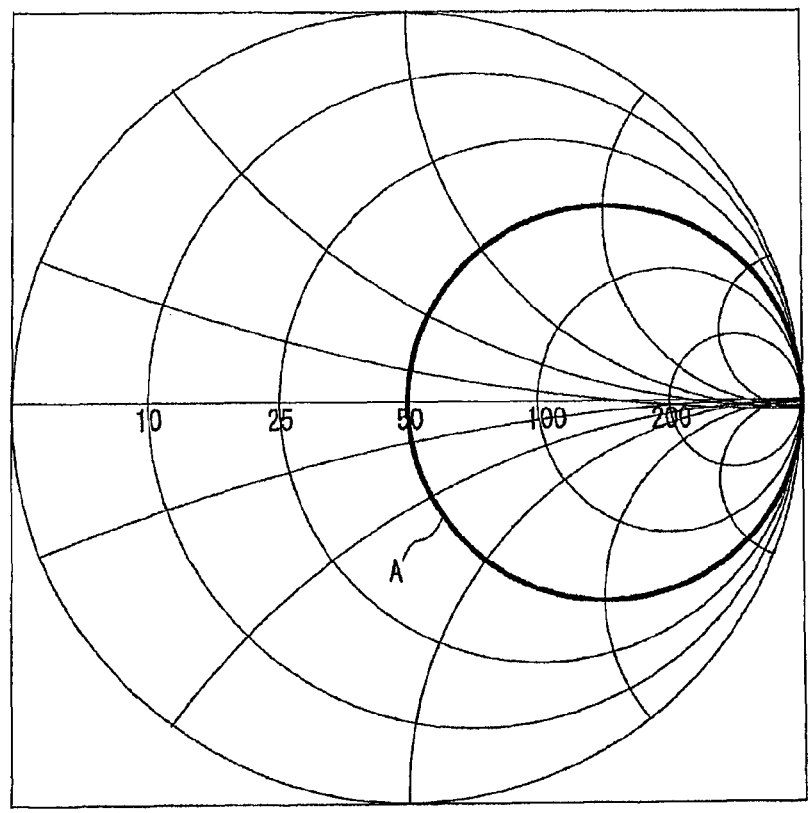
FIG. 11 is a Smith chart describing antenna characteristics in the embodiment of the present invention.

In a state in which the planar conducting plate 361 has been installed on the printed circuit board 351, the resonance frequency of the antenna 450 is 315 MHz, the characteristic curve, employing a Smith chart, being represented as curve A shown in FIG. 11, and the antenna impedance at 315 MHz is 50 ohms. The interval D between the printed circuit board 351 and the planar conducting plate 361 at this time has been set to 1.5 mm by the retainers 371.

In the present embodiment, the eight transmitting units 100 are disposed in such a way that, even with the eight transmitting units 100 accommodated within the minimum space necessary within the case 11 of the transmission device 10, the decline in transmit gain is minimized so that emission of radio waves can take place in a satisfactory manner.

In the present embodiment, disposition takes place in either of the following two ways, in order to minimize the decline in transmit gain so that emission of radio waves can take place in a satisfactory manner.

(1) In an xyz orthogonal coordinate system, only two of the transmitting units 100 are disposed so as to be adjacent in the z axis direction, and so that the planar conductor plates 361 are opposed to each other; two of the transmitting units 100 that are adjacent in the x axis direction are disposed so that one end portion of one of the units and the other end portion of the other of the units are adjacent; and two of the transmitting units 100 that are adjacent in the y axis direction are disposed so that one end portion of one of the units and the other end portion of the other of the units are adjacent.

(2) In an xyz orthogonal coordinate system, only two of the transmitting units are adjacent in the z axis direction so that the first printed circuit boards 351 are opposed to each other, and are disposed so that one end portion of one transmitting unit 100 and the other end portion of the other transmitting unit 100 are adjacent; two of the transmitting units 100 that are adjacent in the x axis direction are disposed so that one end portion of one of the units and the other end portion of the other of the units are adjacent; and two of the transmitting units 100 that are adjacent in the y axis direction are disposed so that one end portion of one of the units and the other end portion of the other of the units are adjacent.

Through disposition of the transmitting units 100 as in the aforedescribed arrangement of (1) or (2), even when a plurality of the transmitting units 100 (not limited to eight, but equal to two or more) has been accommodated within the minimum space necessary, decline of transmit gain can be kept to a minimum, and emission of radio waves can take place in a satisfactory fashion.

The description next turns to example 1, example 2, and comparative examples 1 to 3, which relate to the disposition of the eight transmitting units 100 in the interior of the case 11 of the transmission device 10.

EXAMPLE 1

Figure 12:
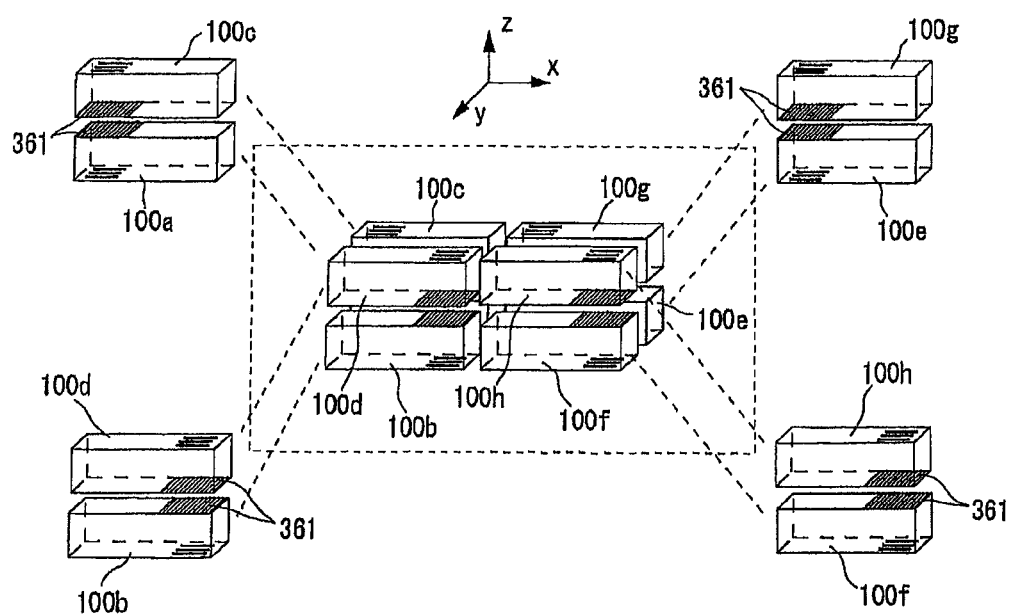
FIG. 12 is a schematic drawing showing the disposition of transmitting units of example 1 in the embodiment of the present invention.

FIG. 12 is a schematic drawing showing the disposition of the transmitting units 100 (100a to 100h) in example 1. The description of the disposition of the eight transmitting units 100 (100a to 100h) employs an xyz orthogonal coordinate system, as shown in the drawing. In FIG. 12, the disposition of the transmitting units 100 (100a to 100h) in the example 1 is depicted inside a wavy line square at the center, while to the outside of the wavy line square, drawings are depicted to show in detail the disposition of the transmitting units 100 (100a to 100h) of each portion.

In the example 1, two of the transmitting units 100 are stacked in the z axis direction, so that the planar conducting plates 361 are opposed to each other. That is, in the drawing, the z axis is set perpendicular to the planes of the first and second printed circuit boards 351, 352 of the unit body 300.

Moreover, in the direction of the x axis, which extends in the lengthwise direction of the transmitting units 100, two adjacent transmitting units are disposed so that one end portion of one of the units and the other end portion of the other of the units are adjacent. In the direction of the y axis, which extends in the width direction of the transmitting units 100, two adjacent transmitting units 100 are disposed so that one end portion of one of the units and the other end portion of the other of the units are adjacent.

The disposition of the eight transmitting units 100 (100a to 100h) in FIG. 12 is described more specifically.

A first transmitting unit 100a is disposed so that the lengthwise direction thereof is aligned with the x axis direction, and the z axis is perpendicular to the plane of the planar conducting plate 361. Furthermore, a third transmitting unit 100c is stacked in the z axis direction on the first transmitting unit 100a, so that the planar conducting plates 361 are opposed to each other. Moreover, a second transmitting unit 100b is disposed next to the first transmitting unit 100a in the y axis direction, the disposition being so that the respective planar conducting plates 361 are positioned in the same plane, one end portion of the first transmitting unit 100a and the other end portion of the second transmitting unit 100b are adjacent, and the other end portion of the first transmitting unit 100a and one end portion of the second transmitting unit 100b are adjacent.

A fourth transmitting unit 100d is stacked in the z axis direction on the second transmitting unit 100b, so that the planar conducting plates 361 are opposed to each other. As a consequence thereof, the fourth transmitting unit 100d is disposed next to the third transmitting unit 100c in the y axis direction, the disposition being so that the respective planar conducting plates 361 of the third transmitting unit 100c and the fourth transmitting unit 100d are positioned in the same plane, one end portion of the third transmitting unit 100c and the other end portion of the fourth transmitting unit 100d are adjacent, and the other end portion of the third transmitting unit 100c and one end portion of the fourth transmitting unit 100d are adjacent.

A fifth transmitting unit 100e is disposed next to the first transmitting unit 100a in the x axis direction. The fifth transmitting unit 100e is disposed so that the lengthwise direction thereof is aligned with the x axis direction, and disposed so that the other end portion of the fifth transmitting unit 100e is adjacent to one end portion of the first transmitting unit 100a.

Furthermore, a seventh transmitting unit 100g is stacked in the z axis direction on the fifth transmitting unit 100e, so that the planar conducting plates 361 are opposed to each other. Moreover, a sixth transmitting unit 100f is disposed next to the fifth transmitting unit 100e in the y axis direction, the disposition being so that the respective planar conducting plates 361 are positioned in the same plane, one end portion of the fifth transmitting unit 100e and the other end portion of the sixth transmitting unit 100f are adjacent, and the other end portion of the fifth transmitting unit 100e and one end portion of the sixth transmitting unit 100f are adjacent.

An eighth transmitting unit 100h is stacked in the z axis direction on the sixth transmitting unit 100f, so that the planar conducting plates 361 are opposed to each other. As a consequence thereof, the eighth transmitting unit 100h is disposed next to the seventh transmitting unit 100g in the y axis direction, the disposition being so that the respective planar conducting plates 361 of the seventh transmitting unit 100g and the eighth transmitting unit 100h are positioned in the same plane, one end portion of the seventh transmitting unit 100g and the other end portion of the eighth transmitting unit 100h are adjacent, and the other end portion of the seventh transmitting unit 100g and one end portion of the eighth transmitting unit 100h are adjacent.

The eight transmitting units 100 (100a to 100h) disposed in the aforedescribed manner are accommodated within the cylindrical case 11 to constitute the transmission device 10, as shown in FIG. 1. The transmission device 10 constituted in this fashion has a transmit gain of −44.9 dBm overall.

Figure 13:
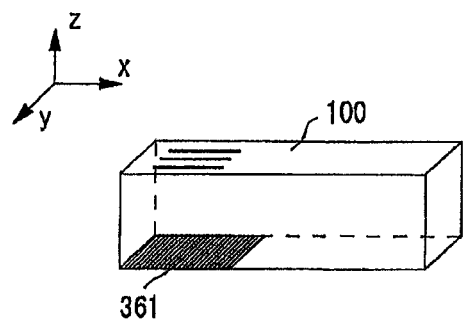
FIG. 13 is a schematic drawing showing a single transmitting unit in the embodiment of the present invention.

For purposes of comparison, the transmit gain in a case in which only a single transmitting unit 100 is employed, as shown in FIG. 13, was measured and found to be −42.7 dBm.

Consequently, the transmit gain of the transmission device 10 of the aforedescribed example 1, when compared to that of a single transmitting unit 100, is substantially the same, the difference being 0.4 dBm, so that even when the eight transmitting units 100a to 100h have been accommodated within the case 11 having the minimum space necessary, the decline in transmit gain in each of the transmitting units 100a to 100h can be kept to a minimum, and emission of radio waves can take place in a satisfactory fashion.

EXAMPLE 2

Figure 14:
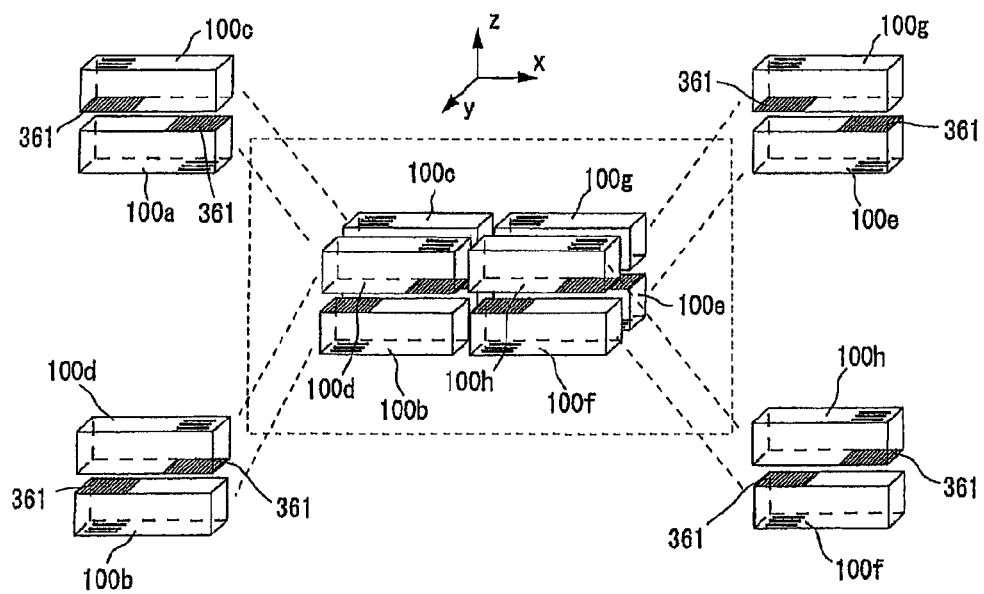
FIG. 14 is a schematic drawing showing the disposition of transmitting units of example 2 in the embodiment of the present invention.

FIG. 14 is a schematic drawing showing the disposition of the transmitting units 100 (100a to 100h) in example 2. The description of the disposition of the eight transmitting units 100 (100a to 100h) employs an xyz orthogonal coordinate system, as shown in the drawing. In FIG. 14, the disposition of the transmitting units 100 (100a to 100h) in the example 2 is depicted inside a wavy line square at the center, while to the outside of the wavy line square, drawings are depicted to show in detail the disposition of the transmitting units 100 (100a to 100h) of each portion.

In the example 2, two of the transmitting units 100 are stacked in the z axis direction, so that the first printed circuit boards 351 are adjacently opposed to each other, and so that one end portion of one of the transmitting units and the other end portion of the other transmitting unit 100 are adjacent. That is, in the drawing, the z axis is set perpendicular to the planes of the first and second printed circuit boards 351, 352 of the unit body 300.

Moreover, in the direction of the x axis, which extends in the lengthwise direction of the transmitting units 100, two adjacent transmitting units are disposed so that one end portion of one of the units and the other end portion of the other of the units are adjacent. In the direction of the y axis, which extends in the width direction of the transmitting units 100, two adjacent transmitting units 100 are disposed so that one end portion of one of the units and the other end portion of the other of the units are adjacent.

The disposition of the eight transmitting units 100 (100a to 100h) in FIG. 14 is described more specifically.

A first transmitting unit 100a is disposed so that the lengthwise direction thereof is aligned with the x axis direction, and the z axis is perpendicular to the plane of the planar conducting plate 361. Furthermore, a third transmitting unit 100c is stacked on the first transmitting unit 100a, so that the first printed circuit boards 351 to which the planar conducting plates 361 are affixed are adjacently opposed to each other, and one end portion of one of the transmitting units 100 and the other end portion of the other transmitting unit 100 are adjacent. Moreover, a second transmitting unit 100b is disposed next to the first transmitting unit 100a in the y axis direction, the disposition being so that the respective planar conducting plates 361 are positioned in the same plane, one end portion of the first transmitting unit 100a and the other end portion of the second transmitting unit 100b are adjacent, and the other end portion of the first transmitting unit 100a and one end portion of the second transmitting unit 100b are adjacent.

A fourth transmitting unit 100d is stacked on the second transmitting unit 100b, so that the first printed circuit boards 351 to which the planar conducting plates 361 are affixed are adjacently opposed, and one end portion of one of the transmitting units 100 and the other end portion of the other transmitting unit 100 are adjacent. As a consequence thereof, the fourth transmitting unit 100d is disposed next to the third transmitting unit 100c in the y axis direction, the disposition being so that the respective planar conducting plates 361 of the third transmitting unit 100c and the fourth transmitting unit 100d are positioned in the same plane, one end portion of the third transmitting unit 100c and the other end portion of the fourth transmitting unit 100d are adjacent, and the other end portion of the third transmitting unit 100c and one end portion of the fourth transmitting unit 100d are adjacent.

A fifth transmitting unit 100e is disposed next to the first transmitting unit 100a in the x axis direction. The fifth transmitting unit 100e is disposed so that the lengthwise direction thereof is aligned with the x axis direction, and disposed so that one end portion of the fifth transmitting unit 100e is adjacent to the other end portion of the first transmitting unit 100a.

Furthermore, a seventh transmitting unit 100g is stacked in the z axis direction on the fifth transmitting unit 100e, so that the first printed circuit boards 351 to which the planar conducting plates 361 are affixed are adjacently opposed, and one end portion of one of the transmitting units 100 and the other end portion of the other transmitting unit 100 are adjacent. Moreover, a sixth transmitting unit 100f is disposed next to the fifth transmitting unit 100e in the y axis direction, the disposition being so that the respective planar conducting plates 361 are positioned in the same plane, one end portion of the fifth transmitting unit 100e and the other end portion of the sixth transmitting unit 100f are adjacent, and the other end portion of the fifth transmitting unit 100e and one end portion of the sixth transmitting unit 100f are adjacent.

An eighth transmitting unit 100h is stacked in the z axis direction on the sixth transmitting unit 100f, so that the first printed circuit boards 351 to which the planar conducting plates 361 are affixed are adjacently opposed, and one end portion of one of the transmitting units 100 and the other end portion of the other transmitting unit 100 are adjacent. As a consequence thereof, the eighth transmitting unit 100h is disposed next to the seventh transmitting unit 100g in the y axis direction, the disposition being so that the respective planar conducting plates 361 of the seventh transmitting unit 100g and the eighth transmitting unit 100h are positioned in the same plane, one end portion of the seventh transmitting unit 100g and the other end portion of the eighth transmitting unit 100h are adjacent, and the other end portion of the seventh transmitting unit 100g and one end portion of the eighth transmitting unit 100h are adjacent.

The eight transmitting units 100 (100a to 100h) disposed in the aforedescribed manner are accommodated within the cylindrical case 11 to constitute the transmission device 10, as shown in FIG. 1. The transmission device 10 constituted in this fashion has overall transmit gain of −44.9 dBm.

Consequently, the transmit gain of the transmission device 10 of the aforedescribed example 2, when compared to that of a single transmitting unit 100, is substantially the same, the difference being −1.8 dBm, so that even when the eight transmitting units 100a to 100h have been accommodated within the case 11 having the minimum space necessary, the decline in transmit gain in the transmitting units 100a to 100h can be kept to a minimum, and emission of radio waves can take place in a satisfactory fashion.

COMPARATIVE EXAMPLE 1

Figure 15:
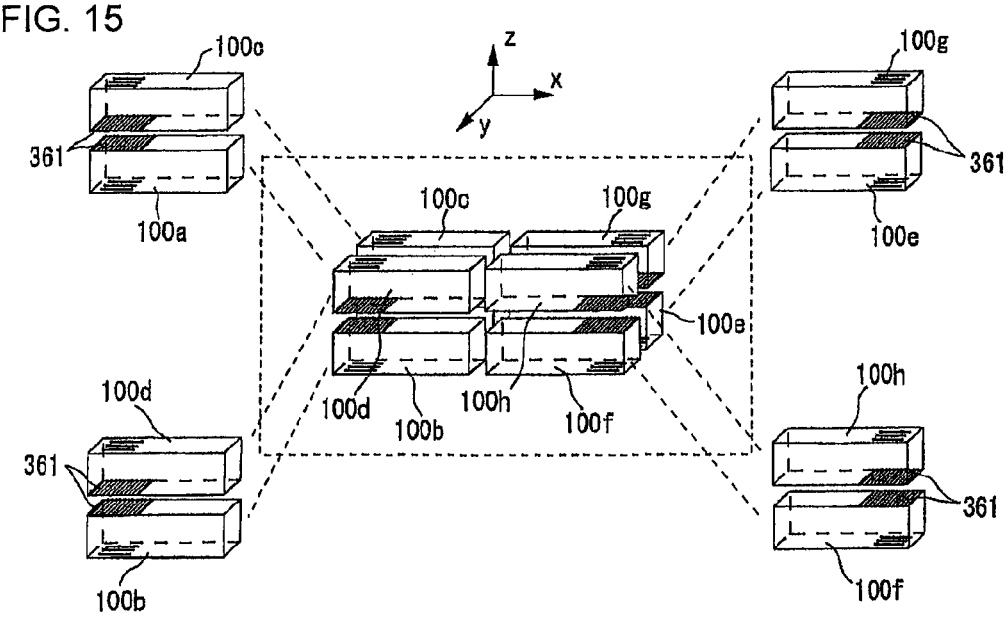
FIG. 15 is a schematic drawing showing the disposition of transmitting units of comparative example 1 in the embodiment of the present invention.

FIG. 15 is a schematic drawing showing the disposition of the transmitting units 100 (100a to 100h) in comparative example 1. The description of the disposition of the eight transmitting units 100 (100a to 100h) employs an xyz orthogonal coordinate system, as shown in the drawing. In FIG. 15, the disposition of the transmitting units 100 (100a to 100h) in the first comparative example is depicted inside a wavy line square at the center, while to the outside of the wavy line square, drawings are depicted to show in detail the disposition of the transmitting units 100 (100a to 100h) of each portion.

In the comparative example 1, two of the transmitting units 100 are stacked in the z axis direction, so that the planar conducting plates 361 are opposed. That is, in the drawing, the z axis is set perpendicular to the planes of the first and second printed circuit boards 351, 352 of the unit body 300.

In the direction of the x axis, which extends in the lengthwise direction of the transmitting units 100, two adjacent transmitting units are disposed so that one end portion of one of the units and the other end portion of the other of the units are adjacent. In the direction of the y axis, which extends in the width direction of the transmitting units 100, two adjacent transmitting units 100 are disposed so that one end portion of one of the units and the other end portion of the other of the units are adjacent.

The disposition of the eight transmitting units 100 (100a to 100h) in FIG. 15 is described more specifically.

A first transmitting unit 100a is disposed so that the lengthwise direction thereof is aligned with the x axis direction, and the z axis is perpendicular to the plane of the planar conducting plate 361. Furthermore, a third transmitting unit 100c is stacked in the z axis direction on the first transmitting unit 100a, so that the planar conducting plates 361 are opposed. Moreover, a second transmitting unit 100b is disposed next to the first transmitting unit 100a in the y axis direction, the disposition being so that the respective planar conducting plates 361 are positioned in the same plane, one end portion of the first transmitting unit 100a and one end portion of the second transmitting unit 100b are adjacent, and the other end portion of the first transmitting unit 100a and the other end portion of the second transmitting unit 100b are adjacent.

A fourth transmitting unit 100d is stacked in the z axis direction on the second transmitting unit 100b, so that the planar conducting plates 361 are opposed. As a consequence thereof, the fourth transmitting unit 100d is disposed next to the third transmitting unit 100c in the y axis direction, the disposition being so that the respective planar conducting plates 361 of the third transmitting unit 100c and the fourth transmitting unit 100d are positioned in the same plane, one end portion of the third transmitting unit 100c and one end portion of the fourth transmitting unit 100d are adjacent, and the other end portion of the third transmitting unit 100c and the other end portion of the fourth transmitting unit 100d are adjacent.

A fifth transmitting unit 100e is disposed next to the first transmitting unit 100a in the x axis direction. The fifth transmitting unit 100e is disposed so that the lengthwise direction thereof is aligned with the x axis direction, and disposed so that first end portion of the fifth transmitting unit 100e is adjacent to one end portion of the first transmitting unit 100a.

Furthermore, a seventh transmitting unit 100g is stacked in the z axis direction on the fifth transmitting unit 100e, so that the planar conducting plates 361 are opposed. Moreover, a sixth transmitting unit 100f is disposed next to the fifth transmitting unit 100e in the y axis direction, the disposition being so that the respective planar conducting plates 361 are positioned in the same plane, one end portion of the fifth transmitting unit 100e and one end portion of the sixth transmitting unit 100f are adjacent, and the other end portion of the fifth transmitting unit 100e and the other end portion of the sixth transmitting unit 100f are adjacent.

An eighth transmitting unit 100h is stacked in the z axis direction on the sixth transmitting unit 100f, so that the planar conducting plates 361 are opposed. As a consequence thereof, the eighth transmitting unit 100h is disposed next to the seventh transmitting unit 100g in the y axis direction, the disposition being so that the respective planar conducting plates 361 of the seventh transmitting unit 100g and the eighth transmitting unit 100h are positioned in the same plane, one end portion of the seventh transmitting unit 100g and one end portion of the eighth transmitting unit 100h are adjacent, and the other end portion of the seventh transmitting unit 100g and the other end portion of the eighth transmitting unit 100h are adjacent.

When the eight transmitting units 100 (100a to 100h) disposed in the aforedescribed manner were accommodated within the cylindrical case 11 to constitute the transmission device 10, as shown in FIG. 1, the transmission device 10 had a transmit gain of −50.4 dBm overall.

Consequently, the transmit gain of the transmission device 10 of the aforedescribed comparative example 1, when compared to that of a single transmitting unit 100, showed considerable attenuation, the difference being −7.3 dBm. Therefore, when the eight transmitting units 100a to 100h are accommodated within the case 11 having the minimum space necessary, the decline of transmit gain in the transmitting units 100a to 100h is considerable, and therefore satisfactory emission of radio waves is considered unlikely.

COMPARATIVE EXAMPLE 2

Figure 16:
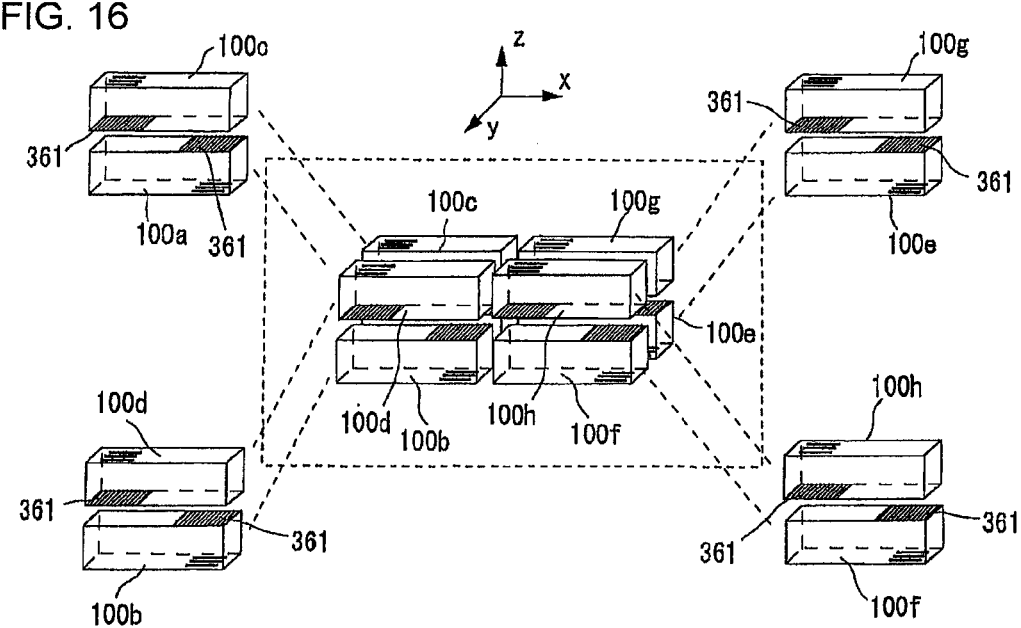
FIG. 16 is a schematic drawing showing the disposition of transmitting units of comparative example 2 in the embodiment of the present invention.

FIG. 16 is a schematic drawing showing the disposition of the transmitting units 100 (100a to 100h) in comparative example 2. The description of the disposition of the eight transmitting units 100 (100a to 100h) employs an xyz orthogonal coordinate system, as shown in the drawing. In FIG. 16, the disposition of the transmitting units 100 (100a to 100h) in the comparative example 2 is depicted inside a wavy line square at the center, while to the outside of the wavy line square, drawings are depicted to show in detail the disposition of the transmitting units 100 (100a to 100h) of each portion.

In the comparative example 2, two of the transmitting units 100 are stacked in the z axis direction, so that the first printed circuit boards 351 are adjacently opposed, and so that one end portion of one of the transmitting units and the other end portion of the other transmitting unit 100 are adjacent. That is, in the drawing, the z axis is set perpendicular to the plane of the first and second printed circuit boards 351, 352 of the unit body 300.

In the direction of the x axis, which extends in the lengthwise direction of the transmitting units 100, two adjacent transmitting units are disposed so that one end portion of one of the units and the other end portion of the other of the units are adjacent. In the direction of the y axis, which extends in the width direction of the transmitting units 100, two adjacent transmitting units 100 are disposed so that one end portion of one of the units and one end portion of the other of the units are adjacent.

The disposition of the eight transmitting units 100 (100a to 100h) in FIG. 16 is described more specifically.

A first transmitting unit 100a is, disposed so that the lengthwise direction thereof is aligned with the x axis direction, and the z axis is perpendicular to the plane of the planar conducting plate 361. Furthermore, a third transmitting unit 100c is stacked on the first transmitting unit 100a, so that the first printed circuit boards 351 to which the planar conducting plates 361 are affixed are adjacently are opposed, and one end portion of one of the transmitting units 100 and the other end portion of the other transmitting unit 100 are adjacent. Moreover, a second transmitting unit 100b is disposed next to the first transmitting unit 100a in the y axis direction, the disposition being so that the respective planar conducting plates 361 are positioned in the same plane, one end portion of the first transmitting unit 100a and one end portion of the second transmitting unit 100b are adjacent, and the other end portion of the first transmitting unit 100a and the other end portion of the second transmitting unit 100b are adjacent.

A fourth transmitting unit 100d is stacked on the second transmitting unit 100b, so that the first printed circuit boards 351 to which the planar conducting plates 361 are affixed are adjacently opposed, and one end portion of one of the transmitting units 100 and the other end portion of the other transmitting unit 100 are adjacent. As a consequence thereof, the fourth transmitting unit 100d is disposed next to the third transmitting unit 100c in the y axis direction, the disposition being so that the respective planar conducting plates 361 of the third transmitting unit 100c and the fourth transmitting unit 100d are positioned in the same plane, one end portion of the third transmitting unit 100c and one end portion of the fourth transmitting unit 100d are adjacent, and the other end portion of the third transmitting unit 100c and the other end portion of the fourth transmitting unit 100d are adjacent.

A fifth transmitting unit 100e is disposed next to the first transmitting unit 100a in the x axis direction. The fifth transmitting unit 100e is disposed so that the lengthwise direction thereof is aligned with the x axis direction, and disposed so that one end portion of the fifth transmitting unit 100e is adjacent to the other end portion of the first transmitting unit 100a.

Furthermore, a seventh transmitting unit 100g is stacked in the z axis direction on the fifth transmitting unit 100e, so that the first printed circuit boards 351 to which the planar conducting plates 361 are affixed are adjacently are opposed, and one end portion of one of the transmitting units 100 and the other end portion of the other transmitting unit 100 are adjacent. Moreover, a sixth transmitting unit 100f is disposed next to the fifth transmitting unit 100e in the y axis direction, the disposition being so that the respective planar conducting plates 361 are positioned in the same plane, one end portion of the fifth transmitting unit 100e and one end portion of the sixth transmitting unit 100f are adjacent, and the other end portion of the fifth transmitting unit 100e and the other end portion of the sixth transmitting unit 100f are adjacent.

An eighth transmitting unit 100h is stacked in the z axis direction on the sixth transmitting unit 100f, so that the first printed circuit boards 351 to which the planar conducting plates 361 are affixed are adjacently are opposed, and one end portion of one of the transmitting units 100 and the other end portion of the other transmitting unit 100 are adjacent. As a consequence thereof, the eighth transmitting unit 100h is disposed next to the seventh transmitting unit 100g in the y axis direction, the disposition being so that the respective planar conducting plates 361 of the seventh transmitting unit 100g and the eighth transmitting unit 100h are positioned in the same plane, one end portion of the seventh transmitting unit 100g and one end portion of the eighth transmitting unit 100h are adjacent, and the other end portion of the seventh transmitting unit 100g and the other end portion of the eighth transmitting unit 100h are adjacent.

The eight transmitting units 100 (100a to 100h) disposed in the aforedescribed manner are accommodated within the cylindrical case 11 to constitute the transmission device 10, as shown in FIG. 1. The transmission device 10 constituted in this fashion has overall transmit gain of −53.7 dBm.

Consequently, the transmit gain of the transmission device 10 of the aforedescribed comparative example 2, when compared to that of a single transmitting unit 100, showed considerable attenuation, the difference being −10.6 dBm. Therefore, when the eight transmitting units 100a to 100h are accommodated within the case 11 having the minimum space necessary, the decline of transmit gain in the transmitting units 100a to 100h is considerable, and therefore satisfactory emission of radio waves is considered unlikely.

COMPARATIVE EXAMPLE 3

Figure 17:
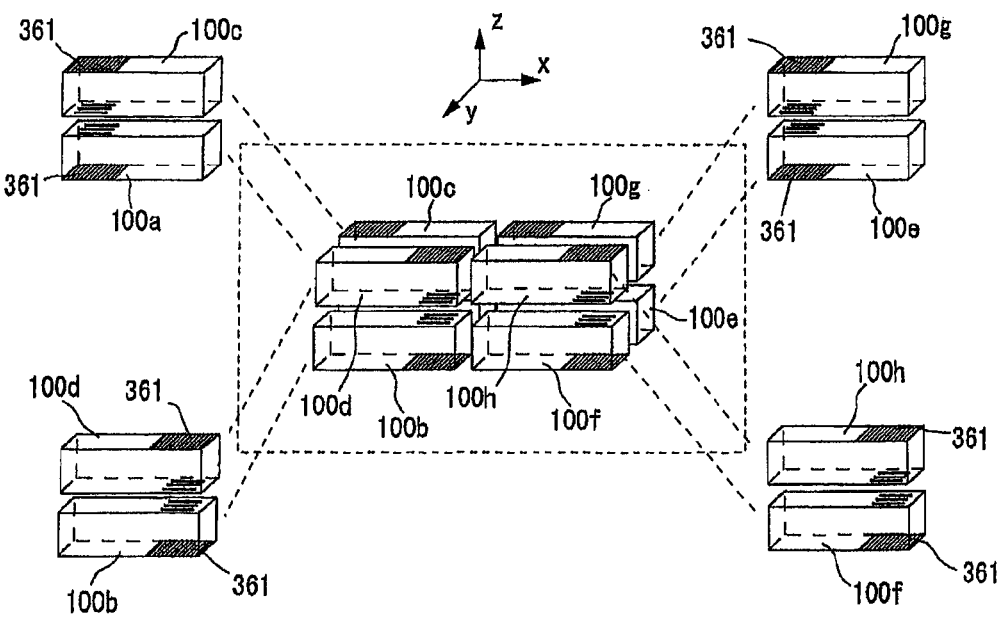
FIG. 17 is a schematic drawing showing the disposition of transmitting units of comparative example 3 in the embodiment of the present invention.

FIG. 17 is a schematic drawing showing the disposition of the transmitting units 100 (100a to 100h) in comparative example 3. The description of the disposition of the eight transmitting units 100 (100a to 100h) employs an xyz orthogonal coordinate system, as shown in the drawing. In FIG. 17, the disposition of the transmitting units 100 (100*a* to 100*h*) in the comparative example 3 is depicted inside a wavy line square at the center, while to the outside of the wavy line square, drawings are depicted to show in detail the disposition of the transmitting units 100 (100*a* to 100*h*) of each portion.

In the comparative example 3, two of the transmitting units 100 are stacked in the z axis direction, so that the second printed circuit boards 352 are opposed. That is, in the drawing, the z axis is set perpendicular to the planes of the first and second printed circuit boards 351, 352 of the unit body 300.

Moreover, in the direction of the x axis, which extends in the lengthwise direction of the transmitting units 100, two adjacent transmitting units are disposed so that one end portion of one of the units and the other end portion of the other of the units are adjacent. In the direction of the y axis, which extends in the width direction of the transmitting units 100, two adjacent transmitting units 100 are disposed so that one end portion of one of the units and the other end portion of the other of the units are adjacent.

The disposition of the eight transmitting units 100 (100*a* to 100*h*) in FIG. 17 is described more specifically.

A first transmitting unit 100*a* is disposed so that the lengthwise direction thereof is aligned with the x axis direction, and the z axis is perpendicular to the plane of the planar conducting plate 361. Furthermore, a third transmitting unit 100*c* is stacked in the z axis direction on the first transmitting unit 100*a*, so that the second printed circuit boards 352 are opposed, and one end portion of one of the transmitting units 100 and one end portion of the other transmitting unit 100 are adjacent. Moreover, a second transmitting unit 100*b* is disposed next to the first transmitting unit 100*a* in the y axis direction, the disposition being so that the respective planar conducting plates 361 are positioned in the same plane, one end portion of the first transmitting unit 100*a* and the other end portion of the second transmitting unit 100*b* are adjacent, and the other end portion of the first transmitting unit 100*a* and one end portion of the second transmitting unit 100*b* are adjacent.

A fourth transmitting unit 100*d* is stacked in the z axis direction on the second transmitting unit 100*b*, so that the second printed circuit boards 352 are opposed, and one end portion of one of the transmitting units 100 and one end portion of the other transmitting unit 100 are adjacent. As a consequence thereof, the fourth transmitting unit 100*d* is disposed next to the third transmitting unit 100*c* in the y axis direction, the disposition being so that the respective planar conducting plates 361 of the third transmitting unit 100*c* and the fourth transmitting unit 100*d* are positioned in the same plane, one end portion of the third transmitting unit 100*c* and the other end portion of the fourth transmitting unit 100*d* are adjacent, and the other end portion of the third transmitting unit 100*c* and one end portion of the fourth transmitting unit 100*d* are adjacent.

A fifth transmitting unit 100*e* is disposed next to the first transmitting unit 100*a* in the x axis direction. The fifth transmitting unit 100*e* is disposed so that the lengthwise direction thereof is aligned with the x axis direction, and disposed so that the other end portion of the fifth transmitting unit 100*e* is adjacent to one end portion of the first transmitting unit 100*a*.

Furthermore, a seventh transmitting unit 100*g* is stacked in the z axis direction on the fifth transmitting unit 100*e*, so that the second printed circuit boards 352 are opposed, and one end portion of one of the transmitting units 100 and one end portion of the other transmitting unit 100 are adjacent. Moreover, a sixth transmitting unit 100*f* is disposed next to the fifth transmitting unit 100*e* in the y axis direction, the disposition being so that the respective planar conducting plates 361 are positioned in the same plane, one end portion of the fifth transmitting unit 100*e* and the other end portion of the sixth transmitting unit 100*f* are adjacent, and the other end portion of the fifth transmitting unit 100*e* and one end portion of the sixth transmitting unit 100*f* are adjacent.

An eighth transmitting unit 100*h* is stacked in the z axis direction on the sixth transmitting unit 100*f*, so that the second printed circuit boards 352 are opposed, and one end portion of one of the transmitting units 100 and one end portion of the other transmitting unit 100 are adjacent. As a consequence thereof, the eighth transmitting unit 100*h* is disposed next to the seventh transmitting unit 100*g* in the y axis direction, the disposition being so that the respective planar conducting plates 361 of the seventh transmitting unit 100*g* and the eighth transmitting unit 100*h* are positioned in the same plane, one end portion of the seventh transmitting unit 100*g* and the other end portion of the eighth transmitting unit 100*h* are adjacent, and the other end portion of the seventh transmitting unit 100*g* and one end portion of the eighth transmitting unit 100*h* are adjacent.

The eight transmitting units 100 (100*a* to 100*h*) disposed in the aforedescribed manner are accommodated within the cylindrical case 11 to constitute the transmission device 10, as shown in FIG. 1. The transmission device 10 constituted in this fashion has overall transmit gain of −53.8 dBm.

Consequently, the transmit gain of the transmission device 10 of the aforedescribed comparative example 3, when compared to that of a single transmitting unit 100, showed considerable attenuation, the difference being −10.7 dBm. Therefore, when the eight transmitting units 100*a* to 100*h* are accommodated within the case 11 having the minimum space necessary, the decline of transmit gain in the transmitting units 100*a* to 100*h* is considerable, and therefore satisfactory emission of radio waves is considered unlikely.

In the aforedescribed embodiments, the drawings are depicted in such a way that there are intervals between the adjacent transmitting units 100*a* to 100*h*; in actual practice, however, the transmitting units 100*a* to 100*h* are disposed in a state so that there are no intervals therebetween.

In the aforedescribed embodiments, the transmitting units 100 have been constituted to detect both air pressure and temperature; however, the transmitting units could be constituted to detect either air pressure or temperature, or some other physical quantity.

In the aforedescribed embodiments, the transmission device installed in a pneumatic fender was described; however, there is no limitation thereto, and the transmission device of the present invention can be applied in applications other than pneumatic fenders.

Even when a plurality of transmitting units is accommodated within the minimum space necessary, the decline in transmit gain of the transmitting units can be kept to a minimum, and emission of radio waves can take place in a satisfactory fashion, whereby a transmission device provided with a plurality of transmitting units can be utilized effectively, in cases in which such a device is necessary.

The invention claimed is:

1. A transmission device in which a plurality of transmitting units are adjacently disposed, comprising:
 the transmitting units having;
  first and second rectangular printed circuit boards disposed so that surfaces thereof are mutually parallel and surfaces on one side of each of the first and second printed circuit boards are in mutual opposition;
  a plurality of columnar connecting conductors furnished between the first printed circuit board and the second printed circuit board, the columnar connecting conductors being adapted for affixing one of the printed circuit boards to the other of the printed circuit boards with a predetermined interval therebetween, and conductively connecting a printed wiring of one of the printed circuit boards and a printed wiring of the other of the printed circuit boards;

an electronic component forming a transmission circuit being mounted at one end portions of the first and second printed circuit boards in a lengthwise direction;

a coil-shaped antenna that has a center axis extending in a width direction of the first and second printed circuit boards at the other end portions of the first and second printed circuit boards in the lengthwise direction; and a planar conductor plate affixed to the first printed circuit board, parallel to the other surface of the first printed circuit board at the other end portion thereof, each of the transmitting units having the planar conductor plate, wherein in an xyz orthogonal coordinate system, only two of the transmitting units are disposed so as to be adjacent in a z axis direction, and so that the planar conductor plates are opposed to each other, two of the transmitting units that are adjacent in an x axis direction being disposed so that the one end portion of one of the transmitting units and the other end portion of the other of the transmitting units are adjacent, and two of the transmitting units that are adjacent in a y axis direction being disposed so that the one end portion of one of the transmitting units and the other end portion of the other of the transmitting units are adjacent.

2. The transmission device according to claim 1, wherein the transmitting units are disposed in sets of two, in each of three respective directions of the x, y, and z axes, with a total of eight transmitting units being provided.

3. The transmission device according claim 1, wherein the plurality of transmitting units are accommodated within a single case.

4. The transmission device according to claim 1, wherein the antenna is formed by printed wirings on the first and second printed circuit boards, and the columnar connecting conductors.

5. The transmission device according to claim 2, wherein the plurality of transmitting units are accommodated within a single case.

6. The transmission device according to claim 2, wherein the antenna is formed by printed wirings on the first and second printed circuit boards, and the columnar connecting conductors.

7. The transmission device according to claim 3, wherein the antenna is formed by printed wirings on the first and second printed circuit boards, and the columnar connecting conductors.

8. The transmission device according to claim 5, wherein the antenna is formed by printed wirings on the first and second printed circuit boards, and the columnar connecting conductors.

9. A transmission device in which a plurality of transmitting units are adjacently disposed, comprising:

the transmitting units having;

first and second rectangular printed circuit boards disposed so that surfaces thereof are mutually parallel and surfaces on one side of each of the first and second printed circuit boards are in mutual opposition;

a plurality of columnar connecting conductors furnished between the first printed circuit board and the second printed circuit board, the columnar connecting conductors being adapted for affixing one of the printed circuit boards to the other of the printed circuit boards with a predetermined interval therebetween, and conductively connecting a printed wiring of one of the printed circuit boards and a printed wiring of the other of the printed circuit boards;

an electronic component forming a transmission circuit being mounted at one end portions of the first and second printed circuit boards in a lengthwise direction;

a coil-shaped antenna that has a center axis extending in a width direction of the first and second printed circuit boards at the other end portions of the first and second printed circuit boards in the lengthwise direction; and a planar conductor plate affixed to the first printed circuit board, parallel to the other surface of the first printed circuit board at the other end portion thereof, wherein in an xyz orthogonal coordinate system, only two of the transmitting units being adjacent in a z axis direction so that the first printed circuit boards are opposed to each other, and are disposed so that one end portion of one of the transmitting units and the other end portion of the other of the transmitting units are adjacent, two of the transmitting units that are adjacent in an x axis direction being disposed so that the one end portion of one of the transmitting units and the other end portion of the other of the transmitting units are adjacent, and two of the transmitting units that are adjacent in a y axis direction being disposed so that the one end portion of one of the transmitting units and the other end portion of the other of the transmitting units are adjacent.

10. The transmission device according to claim 9, wherein the transmitting units are disposed in sets of two, in each of three respective directions of the x, y, and z axes, with a total of eight transmitting units being provided.

11. The transmission device according to claim 9, wherein the plurality of transmitting units are accommodated within a single case.

12. The transmission device according to claim 10, wherein
the plurality of transmitting units are accommodated within a single case.

13. The transmission device according to claim 9, wherein the antenna is formed by printed wirings on the first and second printed circuit boards, and the columnar connecting conductors.

14. The transmission device according to claim 10, wherein
the antenna is formed by printed wirings on the first and second printed circuit boards, and the columnar connecting conductors.

15. The transmission device according to claim 11, wherein
the antenna is formed by printed wirings on the first and second printed circuit boards, and the columnar connecting conductors.

16. The transmission device according to claim 12, wherein
the antenna is formed by printed wirings on the first and second printed circuit boards, and the columnar connecting conductors.

* * * * *